(12) United States Patent
Takai

(10) Patent No.: US 7,952,809 B2
(45) Date of Patent: May 31, 2011

(54) LENS ARRAY

(75) Inventor: Yuichi Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 12/306,909

(22) PCT Filed: Jul. 10, 2007

(86) PCT No.: PCT/JP2007/064049
§ 371 (c)(1),
(2), (4) Date: May 12, 2009

(87) PCT Pub. No.: WO2008/007797
PCT Pub. Date: Jan. 17, 2008

(65) Prior Publication Data
US 2009/0268303 A1    Oct. 29, 2009

(30) Foreign Application Priority Data

Jul. 10, 2006  (JP) ................................. 2006-188781
Dec. 19, 2006  (JP) ................................. 2006-341595

(51) Int. Cl.
G02B 1/06    (2006.01)
G02B 3/12    (2006.01)
(52) U.S. Cl. ........................ 359/666; 359/665
(58) Field of Classification Search .................. 359/290, 359/297, 665, 666, 721, 886
See application file for complete search history.

(56) References Cited

U.S. PATENT DOCUMENTS

| | | |
|---|---|---|
| 5,731,792 A | 3/1998 | Sheridon |
| 6,603,444 B1 | 8/2003 | Kawanami et al. |
| 2008/0310031 A1 | 12/2008 | Mohr et al. |

FOREIGN PATENT DOCUMENTS

| | | |
|---|---|---|
| EP | 1986023 | 10/2008 |
| EP | 2040116 A1 * | 3/2009 |
| JP | 09-311643 | 2/1997 |
| JP | 10-39799 | 2/1998 |
| JP | 2000-356708 | 12/2000 |
| JP | 2000-356750 | 12/2000 |
| JP | 2002-162507 | 6/2002 |
| JP | 2002-169110 | 6/2002 |

OTHER PUBLICATIONS

English-language Translation of The Written Opinion of the International Searching Authority (PCT/ISA/237), prepared for PCT/JP2007/064049 (Jan. 14, 2009).*

(Continued)

Primary Examiner — David N Spector
(74) Attorney, Agent, or Firm — Robert J. Depke; Rockey, Depke & Lyons, LLC

(57) ABSTRACT

A lens array capable of making the characteristics of lens elements uniform is provided. A lens array 10 according to the present invention includes first liquid 11 that is conductive, second liquid 12 that is insulative and that has a refractive index different from that of the first liquid, and a plurality of lens elements 13 forming lens surfaces 13A at an interface between the first liquid 11 and the second liquid 12. The lens surfaces 13A of the lens elements 13 reversibly vary in accordance with output control of an applied voltage. The lens array is structured such that the adjacent lens elements 13 liquidly communicate with each other, whereby differences in the amounts of the first liquid 11 and the second liquid 12 between the lens elements can be avoided and the lens characteristics can be made uniform.

11 Claims, 15 Drawing Sheets

OTHER PUBLICATIONS

English-language Translation for Japanese Patent Application Publication JP2000-356708A;Industrial Property Digital Library <http://www.ipdl.inpit.go.jp/homepg_e.ipdl> (download/access Aug. 30, 2010).*

English-language Translation for Japanese Patent Application Publication JP2002-169110A;Industrial Property Digital Library <http://www.ipdl.inpit.go.jp/homepg_e.ipdl> (download/access Aug. 30, 2010).*

* cited by examiner

A $\kappa^{-1}$ (mm) OR LESS

B $\kappa^{-1}$ (mm) OR MORE

FIG. 3

|  | INTERFACIAL TENSION [mN/m] | DENSITY DIFFERENCE [g/cm3] | CAPILLARY LENGTH [mm] |
|---|---|---|---|
| WATER AND AIR | 72.88 | 0.99997 | 2.7 |
| WATER AND OIL | 29.5 | 0.0129 | 15.2 |

A

B

A

B

A

B

A

B

LENS ARRAY

This application is a 371 U.S. National Stage filing of PCT/JP2007/064049, filed on Jul. 10, 2007, which claims priority to Japanese Patent Application Number 2006-188781 filed at the Japanese Patent Office on Jul. 10, 2006, and Japanese Patent Application Number 2006-34595 filed at the Japanese Patent Office on Dec. 19, 2006, all of which are incorporated herein by reference.

TECHNICAL FIELD

The present invention relates to a lens array which utilizes electrowetting effect (electrocapillarity).

BACKGROUND ART

Recently, the development of optical elements utilizing the electrowetting effect has progressed. The electrowetting effect is a phenomenon in which, when a voltage is applied between conductive liquid and an electrode, energy at a solid-liquid interface between the surface of the electrode and the liquid changes and the shape of the liquid surface changes accordingly.

Part A of FIG. 14 and part B of FIG. 14 are principle diagrams illustrating the electrowetting effect. As shown in part A of FIG. 14, an insulating film 2 is formed on a surface of an electrode 1, and a droplet 3 of electrolyte is placed on the insulating film 2. The surface of the insulating film 2 is subjected to water repellent finishing. In a no-voltage state shown in part A of FIG. 14, interaction energy between the surface of the insulating film 2 and the droplet 3 is low and a contact angle θ0 is large. Here, the contact angle θ0 is an angle between the surface of the insulating film 2 and a tangent line of the droplet 3, and depends on characteristics such as the surface tension of the droplet 3 and the surface energy of the insulating film 2.

On the other hand, as shown in part B of FIG. 14, when a predetermined voltage is applied between the electrode 1 and the droplet 3, electrolyte ions in the droplet 3 collect at the surface of the insulating film 2, so that an amount of charge of a charge double layer changes and a change in the surface tension of the droplet 3 is induced. This phenomenon is the electrowetting effect, and the contact angle θv of the droplet 3 changes in accordance with the magnitude of the applied voltage. In other words, in part B of FIG. 14, the contact angle θv can be expressed as a function of voltage V as in the following Equation (1):

[Equation 1]

$$\cos\theta_V = \cos\theta_0 + \frac{\varepsilon_0 \varepsilon}{2e\gamma_{LG}} V^2 \quad (1)$$

$\gamma_{LG}$: Surface tension of electrolyte
e: Film thickness of insulating film
$\varepsilon$: Relative dielectric constant of insulating film
$\varepsilon_0$: Magnetic permeability of vacuum As described above, the surface shape (curvature) of the droplet 3 changes in accordance with the magnitude of the voltage V applied between the electrode 1 and the droplet 3. Therefore, when the droplet 3 is used as a lens element, an optical element having a focal position that can be electrically controlled can be obtained.

Now, the development of optical apparatuses including optical elements structured as above is progressing. For example, a lens array for a strobe apparatus has been proposed in Japanese Unexamined Patent Application Publication No. 2000-356708. In this example, a varifocal lens is structured by enclosing conductive liquid and droplets of insulative liquid arranged in an array pattern on a water-repellent film provided on a surface of a substrate. In this structure, individual lenses are formed in the shape of the interface between the insulative liquid and the conductive liquid. The shape of each lens is electrically controlled by utilizing the electrowetting effect, and accordingly the focal length is varied.

In addition, Japanese Unexamined Patent Application Publication No. 2004-252444 discloses the structure of a display device utilizing the electrowetting effect. In this display device, cells containing colored droplets are arranged in an array pattern, and a desired color image is displayed by selectively driving the cells. It is possible to structure the above-described cells not only as an image displaying unit but also as a lens element, such as a varifocal lens. An example of such a structure is shown in part A of FIG. 15 and part B of FIG. 15. FIG. 15 shows the schematic structure of a lens array 50 structured by arranging the lens elements in an array pattern. Part A of FIG. 15 is a plan view of a common substrate 54 included in the lens array 50, and part B of FIG. 15 is a sectional view of the main part of the lens array 50.

The lens array 50 includes a plurality of lens elements 53 in which lens surfaces are formed by interfaces between first liquid 51 that is conductive and second liquid 52 that is insulative. The first liquid 51 and the second liquid 52 have refractive indices that are different from each other, and exist without being mixed with each other. The individual lens elements 53 are two-dimensionally arranged in a sealed liquid chamber formed between the transparent common substrate 54 and a transparent lid body 55. The adjacent lens elements 53 are separated from each other by separation walls 56. A transparent electrode film 58 is formed on the bottom surface of the common substrate 54, and the top surface of the common substrate 54 is subjected to water repellent finishing in an area where the second liquid 52 comes into contact therewith. A transparent electrode film 57 is formed as a counter electrode on the bottom surface of the lid body 55 in an area where the first liquid 51 comes into contact therewith.

In the lens array 50 having the above-described structure, when a voltage applied between the pair of transparent electrode films 57 and 58 is controlled, the shape of the interface between the first liquid 51 and the second liquid 52 in each lens element 53 varies. Therefore, it becomes possible to reversibly vary a focal length of light that passes through the lens array 50, and the lens array 50 is suitable for use as a varifocal lens in a strobe apparatus of a camera.

However, in the above-described lens array 50 according to a related art, the periphery of each of the lens elements 53 is surrounded by the separation walls 56. Therefore, in a process of manufacturing the lens array 50, each of the cells must be individually supplied with, in particular, the second liquid 52 of the first liquid 51 and the second liquid 52 constituting the lens elements 53. The amount of this work increases as the number of element increases. In addition, there may be a case where the supply amount differs between the cells and characteristics of the lens elements 53 become non-uniform.

The present invention has been made in view of the above-described problems, and an object of the present invention is to provide a lens array capable of making the characteristics of lens elements uniform.

DISCLOSURE OF INVENTION

To achieve the above-described object, a lens array according to the present invention includes first liquid that is conductive; second liquid that is insulative and that has a refractive index different from that of the first liquid; and a plurality of lens elements forming lens surfaces at an interface between the first liquid and the second liquid. The lens surfaces of the lens elements reversibly vary in accordance with output control of an applied voltage. The lens array is characterized in that the adjacent lens elements liquidly communicate with each other.

According to the present invention, instead of the structure in which the periphery of each lens element is completely covered, the structure is adopted in which the adjacent lens elements liquidly communicate with each other. Therefore, differences in the amounts of the first liquid and the second liquid between the lens elements can be avoided and the lens characteristics can be made uniform.

More specifically, according to the lens array of the present invention, the lens elements are arranged in a liquid chamber formed between a common substrate and a lid body, and at least one of the first liquid and the second liquid communicates between the adjacent lens elements with respect to each other.

In this case, the lens elements may be sectioned by a plurality of projections provided so as to stand upright on the common substrate. The projections may be rod-shaped projections disposed at four corners of each of the lens elements. In addition, the projections may be formed of linear projections which are disposed between the adjacent lens elements and in which passages for allowing liquid communication between the adjacent lens elements are formed.

In addition, the lens elements may be sectioned by an opening-free portion of a perforated plate that is disposed in the liquid chamber. The perforated plate forms passages that allow liquid communication at least between the perforated plate and the common substrate. The shape of the openings in the perforated plate may be, for example, circular. However, the shape is not limited to this, and may also be oval, polygonal, or the like.

As described above, in the lens array according to the present invention, the lens elements liquidly communicate with each other. Therefore, differences in the amounts of the first liquid and the second liquid between the lens elements can be avoided and the lens characteristics can be made uniform. In addition, a structure having a very small dimension, which cannot be obtained by a liquid introducing method using a syringe, a dispenser nozzle, or the like, can be easily obtained.

BRIEF DESCRIPTION OF DRAWINGS

FIG. 3 is a diagram in which the magnitudes of interfacial tension, density difference, and capillary length for the combination of water and air and the combination of water and oil are compared with each other.

BEST MODES FOR CARRYING OUT THE INVENTION

Hereinafter, each embodiment of the present invention will be described with reference to the drawings. It is to be noted that the present invention is not limited to each of the embodiments described below, and various modifications are possible on the basis of the technical idea of the present invention.

First Embodiment

Figure 1:
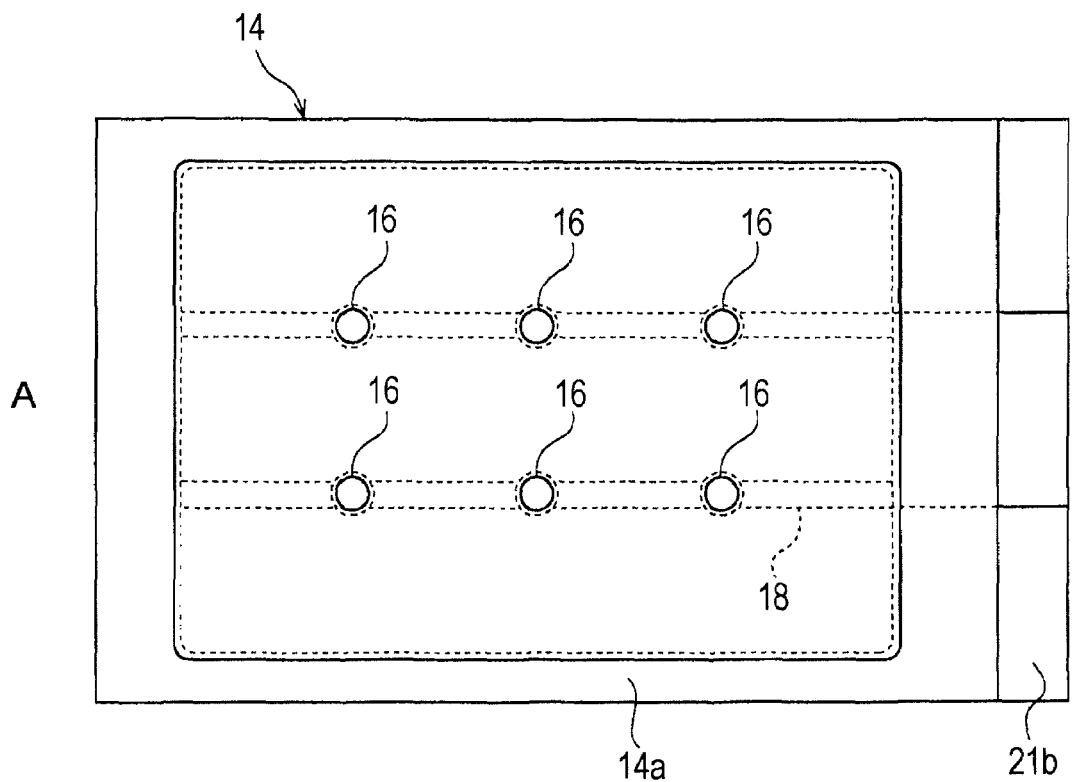
FIG. 1 is a diagram showing the schematic structure of a lens array according to a first embodiment of the present invention, wherein part A of FIG. 1 is a plan view of a common substrate and part B of FIG. 1 is a sectional view of the main part of the lens array.
Figure 1:
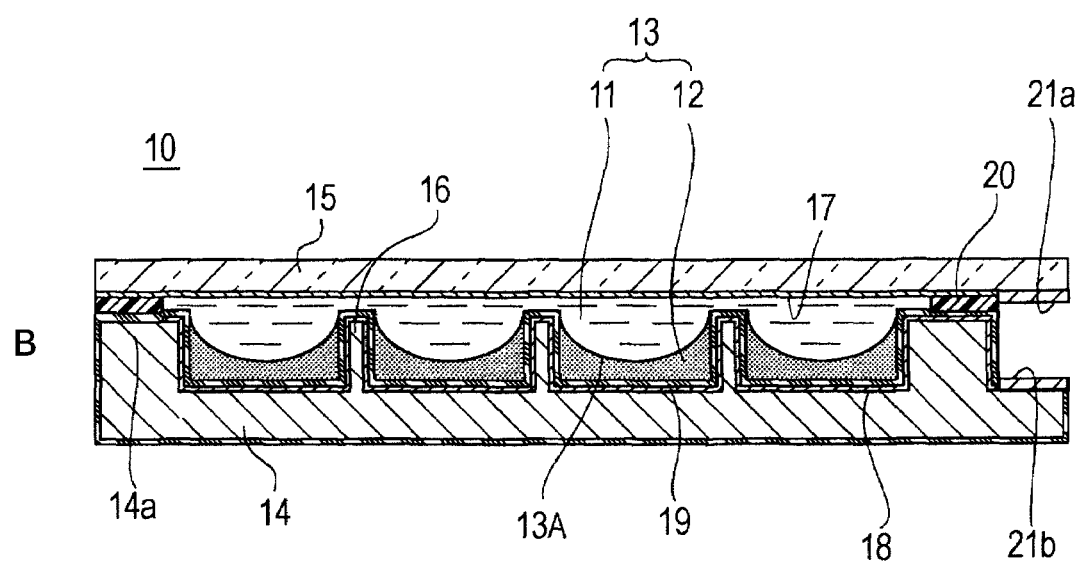

Part A of FIG. 1 and part B of FIG. 1 show the schematic structure of a lens array 10 according to a first embodiment of the present invention. Part A of FIG. 1 is a plan view of a common substrate 14 included in the lens array 10, and part B of FIG. 1 is a sectional view of the main part of the lens array 10. The lens array 10 according to the present embodiment includes a plurality of lens elements 13 in which lens surfaces 13A are formed by interfaces between first liquid 11 that is conductive and second liquid 12 that is insulative. The lens array 10 is used in, for example, an illuminating optical system, and is structured as a varifocal lens which arbitrarily varies a focal length of light that passes through the lens array 10.

Transparent conductive liquid is used as the first liquid 11. For example, polar liquid such as water, electrolyte (aqueous solution of electrolyte such as potassium chloride, sodium chloride, and lithium chloride), alcohols, such as methyl alcohol and ethyl alcohol, having small molecular weight, and ambient temperature molten salt (ionic liquid) may be used.

Transparent insulative liquid is used as the second liquid 12. For example, nonpolar solvent such as hydrocarbon materials including decane, dodecane, hexadecane, and undecane, silicone oil, and fluorinated materials may be used.

The first liquid 11 and the second liquid 12 have refractive indices that are different from each other, and are made of materials capable of existing without being mixed with each other. More specifically, in the present embodiment, aqueous solution of lithium chloride (concentration 3.66 wt %, refractive index 1.34) is used as the first liquid 11 and silicone oil (TSF437 produced by GE Toshiba Silicone Co., Ltd., refractive index 1.49) is used as the second liquid 12. In addition, the first liquid 11 and the second liquid 12 preferably have specific gravities that are similar to each other. In addition, the first liquid 11 and the second liquid 12 may be colored as necessary.

A sealed liquid chamber that is formed between the common substrate 14 and a lid body 15 is filled with the first liquid 11 and the second liquid 12, and the individual lens elements 13 are two-dimensionally arranged in the sealed liquid chamber. The common substrate 14 is optically transparent, and can be formed of a body of electrically insulative plastic material obtained by injection molding, cutting, or the like. The lid body 15 is optically transparent, and can be formed of an electrically insulative plastic material, a glass material, or the like.

The lid body 15 is fixed to top surfaces of side walls 14a of the common substrate 14 with a sealing member 20 interposed therebetween. A transparent electrode film 17, which is connected to a terminal portion 21a, is formed on the inner surface side of the lid body 15 that faces the liquid chamber. Here, the transparent electrode film 17 may be formed of metal, conductive oxide, semiconductor material, or the like. In addition, instead of the transparent electrode, an optically opaque electrode material may also be used as long as a pattern is formed in an area outside the light transmitting surface.

The adjacent lens elements 13 are sectioned from each other by a plurality of projections 16 which are provided so as to stand upright on a top surface of the common substrate 14. The projections 16 are formed integrally with the common substrate 14, are disposed at positions corresponding to four corners of the individual lens elements 13, and have a rod shape. The projections 16 are, for example, formed at the time when the common substrate 14 is formed by injection molding. Alternatively, the projections 16 may also be formed by post processing, such as adhesion or press fitting, after the common substrate 14 is formed.

Here, a transparent electrode film 18 is formed on the top surface of the common substrate 14. In the present embodiment, the transparent electrode film 18 is formed in a pattern so as to cover the inner peripheral surfaces of the side walls 14a of the common substrate 14 and the outer surfaces of the projections 16. However, the transparent electrode film 18 may also be formed so as to extend over the entire area of the top surface of the common substrate 14. The transparent electrode film 18 is connected to a terminal portion 21b through a side wall portion of the common substrate 14. Here, the transparent electrode film 18 may be formed of metal, conductive oxide, semiconductor material, or the like. In addition, in the case where the electrode film is formed in a pattern, a non-transparent electrode film may also be used as long as the transmission of light is not largely blocked.

In addition, an insulting film 19 is formed on the surface of the common substrate 14 so as to cover the transparent electrode film 18. In the present embodiment, the insulting film 19 is formed so as to cover the entire area of the outer surface of the common substrate 14. However, the insulting film 19 may also be formed, for example, only on the top surface side of the common substrate 14.

The insulating film 19 is not particularly limited as long as it is made of an electrically insulative material, but is preferably made of a material having a relatively high dielectric constant. In addition, to obtain a relatively large capacitance, the film thickness of the insulating film 19 is preferably small. However, it is necessary that the film thickness be equal to or larger than a thickness at which the insulating strength can be ensured. Examples of materials having a relatively high dielectric constant include metal oxides such as tantalum oxide and titanium oxide. However, the material is, of course, not limited to this. A method for forming the insulating film 19 is also not particularly limited, and vacuum thin-film forming methods such as a sputtering method, a CVD method, and a deposition method and other various coating methods such as a plating method, an electrodeposition method, a coating method, and a dipping method may be adopted.

In addition, the insulating film 19 preferably exhibits water repellency in an area where the second liquid 12 comes into contact therewith. Examples of methods for forming the water-repellent film include a method of forming a film of poly-para-xylylene by a CVD method and a method of coating the common substrate 14 with a material like PVDF (polyvinylidene fluoride) and PTFE (polytetrafluoroethylene), which are fluorinated polymers. Alternatively, the insulating film 19 may also be formed in a layered structure in which a plurality of materials including a high dielectric constant material and a water repellent material are combined.

The lens array 10 according to the present embodiment includes a plurality of lens elements 13 in which the first liquid 11 is disposed at the lid-body-15 side and the second liquid 12 is disposed at the common-substrate-14 side. The arrangement positions of the respective lens elements 13 are determined by the inner peripheral portions of the side walls 14a of the common substrate 14 and the projections 16. More specifically, in the example shown in part A of FIG. 1, twelve rectangular lens elements 13 in total, which are arranged along a plane in an array pattern of three rows and four columns, are provided between the inner peripheral portions of the side walls 14a and the projections 16 adjacent thereto and between the projections 16 adjacent to each other. Here, in practice, the number of projections 16 provided so as to stand upright is larger than that in the example shown in the figure, and accordingly a larger number of lens elements 13 are arranged.

In the state shown in part B of FIG. 1, the first liquid 11 is in contact with the inner surfaces of the side walls 14a of the common substrate 14 or the peripheral surfaces of the projections 16 at a predetermined contact angle so that lens surfaces 13A of the respective lens elements 13 have a predetermined curved surface shape. The lens surfaces 13A have the curved surface shape such that lines connecting the inner surfaces of the side walls 14a to the projections 16 or connecting the projections 16 to each other define ridgelines, and are concavely curved at central areas of the rectangular elements.

When a voltage is applied between the terminal portions 21a and 21b in this state, the first liquid 11 spreads over the inner peripheral surfaces of the side walls 14a and the peripheral surfaces of the projections 16 due to the electrowetting effect (electrocapillarity). Accordingly, the contact angle at which the first liquid 11 is in contact with the inner peripheral surfaces of the side walls 14a and the peripheral surfaces of the projections 16 changes, which causes a change in the shape of the lens surfaces 13A. The shape of the lens surfaces 13A changes reversibly. Therefore, the lens surfaces 13A of the respective lens elements 13 arbitrarily change in accordance with the magnitude of the voltage applied to the terminal portions 21a and 21b. More specifically, when the applied voltage is increased, the radius of curvature of the lens surfaces 13A increases. As a result, the focal length also increases. Therefore, the lens array 10 can be caused to function as a varifocal lens for light that passes through the lens array 10.

Here, according to the present embodiment, the first liquid 11 and the second liquid 12 in the adjacent lens elements 13 communicate with each other through the spaced between the rod-shaped projections 16. Therefore, compared to the structure according to the related art in which the periphery of each lens element is surrounded by separation walls, separation-forming areas between the lens elements can be considerably reduced. Accordingly, the effective lens area can be increased and the transmittance can be improved.

In addition, the shape accuracy of each lens element 13 can be controlled by the processing accuracy of the projections 16. Therefore, the processing area for ensuring the shape accuracy of the lens elements 13 can be reduced compared to that in the structure of the related art, and the manufacturing costs of the lens array 10 can be greatly reduced.

Furthermore, in the structure of the present embodiment, the first liquid 11 and the second liquid 12 in the adjacent lens elements 13 communicate with each other. Therefore, the interfaces between the first liquid 11 and the second liquid 12 are connected to each other to form a single interface. In addition, the interface energy of this interface tries to minimize itself, so that differences between the individual lens elements 13 are reduced. Accordingly, differences in the amounts of the first liquid 11 and the second liquid 12 between the individual lens elements 13 can be reduced. In addition, it becomes unnecessary to adjust the amount of liquid for each element at high accuracy. Due to the above-described structure, the lens characteristics of the individual lens elements 13 included in lens array 10 can be easily and uniformly performed and the lens array 10 can be easily assembled.

In addition, generation of bubbles in the liquid chamber can be suppressed. Even when bubbles are generated, they can be easily discharged to the outside because the liquid in the liquid chamber communicates between the elements. In addition, an advantage that foreign bodies mixed into the liquid chamber can be easily discharged can also be obtained.

Here, the shape, size, etc., of the lens elements 13 can be substantially arbitrarily set in accordance with the intervals at which the projections 16 are formed, the cross sectional shape of the projections 16, and the like. For example, when the projections 16 are formed at constant intervals in both the vertical direction and the horizontal direction in FIG. 1, lens elements having a square shape in a plan view can be obtained and a lens array having uniform lens characteristics can be obtained a the same time. Conversely, when the intervals at which the projections 16 are formed are changed for each area, a lens array having different lens characteristics can be obtained.

Figure 2:
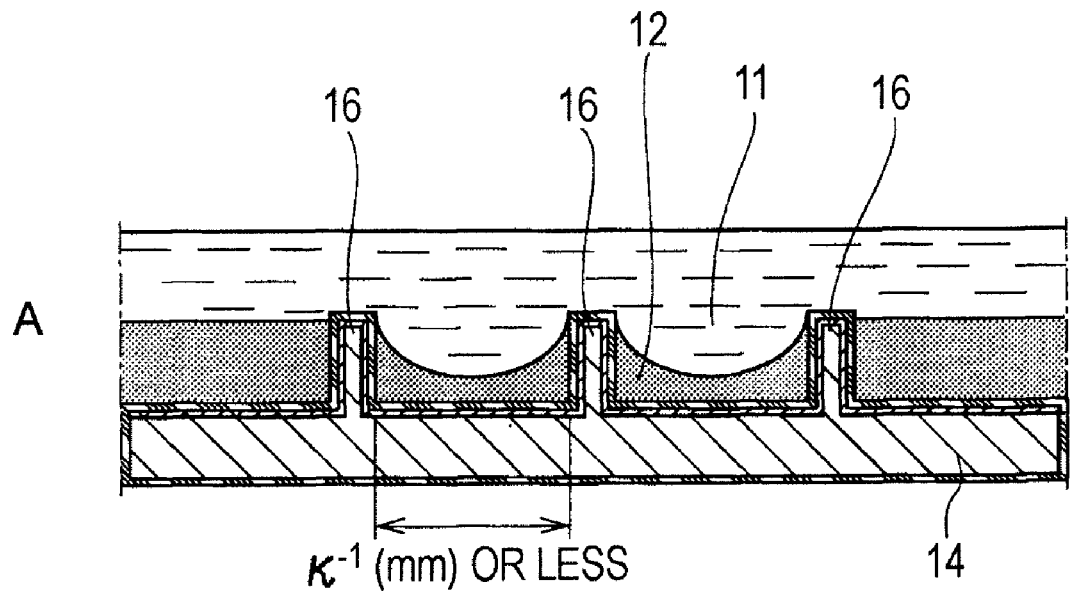
FIG. 2 shows sectional views illustrating intervals at which projections are formed to section individual lens elements in the lens array shown in FIG. 1.
Figure 2:
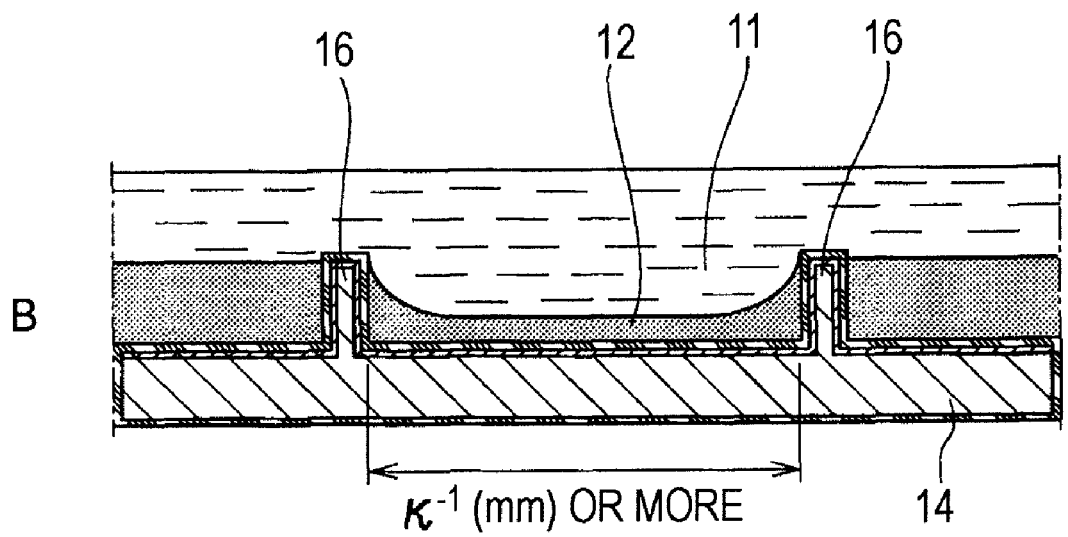

In addition, the distances between the projections 16 that are adjacent to each other and the distances between the inner surfaces of the side walls 14a of the common substrate and the projections 16 adjacent thereto are set equal to or less than a capillary length. The capillary length is the maximum length within which the influence of gravity on the interfacial tension can be ignored. In the relationship between conductive liquid and insulative liquid, the capillary length can be express as in the following Equation (2):

[Equation 2]

$$\kappa^{-1} = \sqrt{\frac{\gamma}{\rho g}} \qquad (2)$$

γ: Interfacial tension between conductive liquid and insulative liquid
ρ: Difference in specific gravity between conductive liquid and insulative liquid
g: Gravitational acceleration Part A of FIG. 2 shows the shape of the interface between the first liquid 11 and the second liquid 12 in the case where the distances between the projections 16 are equal to or less than the capillary length ($K^{-1}$). If the distances between the projections 16 are equal to or less than the capillary length, the interface between the first liquid 11 and the second liquid 12 maintains the curved surface shape thereof without being influenced by gravity. Thus, the shape of the interference can be controlled using electrocapillarity. In comparison, if the distances between the projections 16 are longer than the capillary length, as shown in part B of FIG. 2, the interface between the first liquid 11 and the second liquid 12 is influenced by gravity and a flat portion is formed at a central area thereof. Therefore, it becomes difficult to change the shape of the interference using electrocapillarity. Therefore, it is necessary that the distances between the projections 16 that are adjacent to each other and the distances between the inner surfaces of the side walls 14a of the common substrate and the projections 16 adjacent thereto be set equal to or less or less than the capillary length. In other words, the lengths of the sides and diagonal lines of the rectangular lens elements are set equal to or less or less than the capillary length.

The capillary length differs in accordance with the kinds of two media that form the interface. In FIG. 3, the interfacial tension, density difference, and capillary length for the combination of water and air and the combination of water and oil are shown to be compared with each other. The capillary length for the case of water and air is 2.7 mm, whereas the capillary length for the case of water and oil is 15.2 mm. Therefore, the intervals between the projections 16 can be increased to 15.2 mm by reducing the density difference (difference in specific gravity) between the above-described first liquid 11 and second liquid 12 to 0.0129.

Although the cross sectional shape of the rod-shaped projections 16 is circular in the example shown in the figure, the shape is, of course, not limited to this, and may also be oval or a high shape, such as triangular or rectangular. In addition, the height of the projections 16 is not limited to that in the case where the height of the projections 16 is smaller than that of the side walls 14a of the common substrate 14, as shown in part B of FIG. 1, and may also be equal to the height of the side walls 14a. In such a case, the projections 16 are in contact with the lid body 15 at the top ends thereof. Therefore, even if the area of the lens array 10 is increased, the gap between the substrate 14 and the lid body 15 can be prevented from being changed due to external force or the like. Therefore, depending on the size of the lens array 10 or use conditions thereof, spaces can be provided between the lid body 15 and the top ends of the projections 16, or only some of the projections 16 may be formed to have a height such that they are in contact with the lid body 15.

Figure 4:
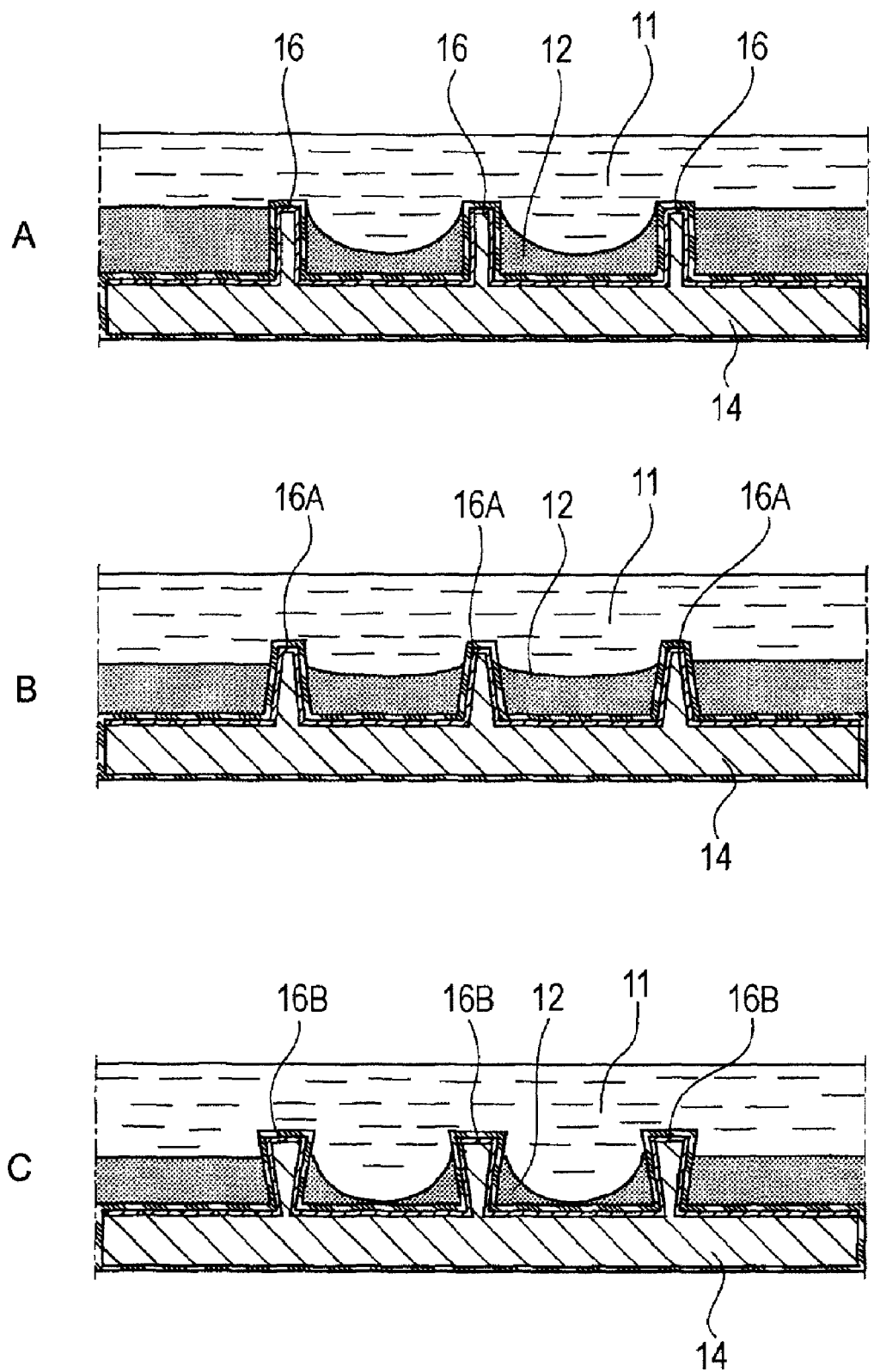
FIG. 4 shows sectional views illustrating the initial shapes of lens surfaces which differ depending on the shape of the projections that section the individual lens elements in the lens array shown in FIG. 1.

In addition, the side surfaces of the projections 16 are not limited to the case in which the side surfaces are perpendicular to the substrate 14, and may also be shaped to be thinner toward the end or thicker toward the end. In FIG. 4, the initial shapes of the interface between the first liquid 11 and the second liquid 12 obtained by projections having different shapes are shown to be compared with each other. Part A of FIG. 4 shows an example in which the projections 16 have a cylindrical shape, part B of FIG. 4 shows an example in which projections 16A are shaped to be thinner toward the end, and part C of FIG. 4 shows an example in which projections 16B are shaped to be thicker toward the end.

It can be understood that, even though the contact angle at which the first liquid 11 is in contact with the side surfaces of the projections is constant, the shape of the interface between the two kinds of liquid largely varies depending on the angle at which the side surfaces of the projections are formed. In the case where the projections 16A are shaped to be thinner toward the end, the curvature of the interface is smaller than that in the case where the projections 16 have a cylindrical shape. In the case where the projections 16B are shaped to be thicker toward the end, the curvature of the interface is larger than that in the case where the projections 16 have a cylindrical shape. A variable focus range of the lens array can be arbitrarily adjusted by optimizing the shape of the projections.

Second Embodiment

Figure 5:
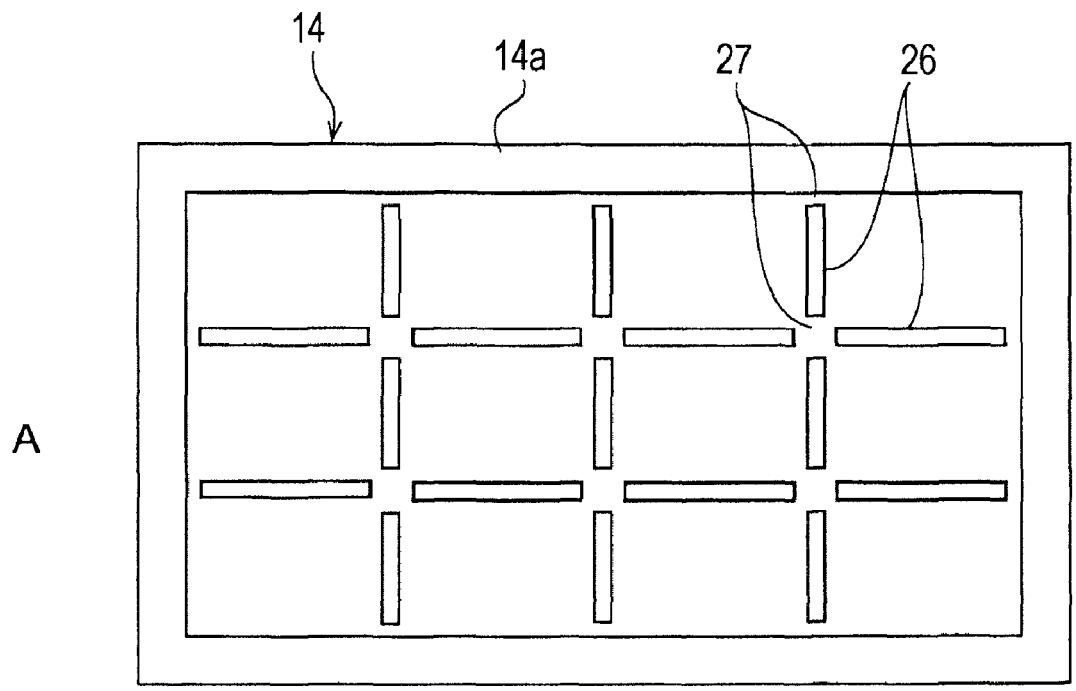
FIG. 5 shows plan views of common substrates to illustrate the structure of a lens array according to a second embodiment of the present invention.
Figure 5:
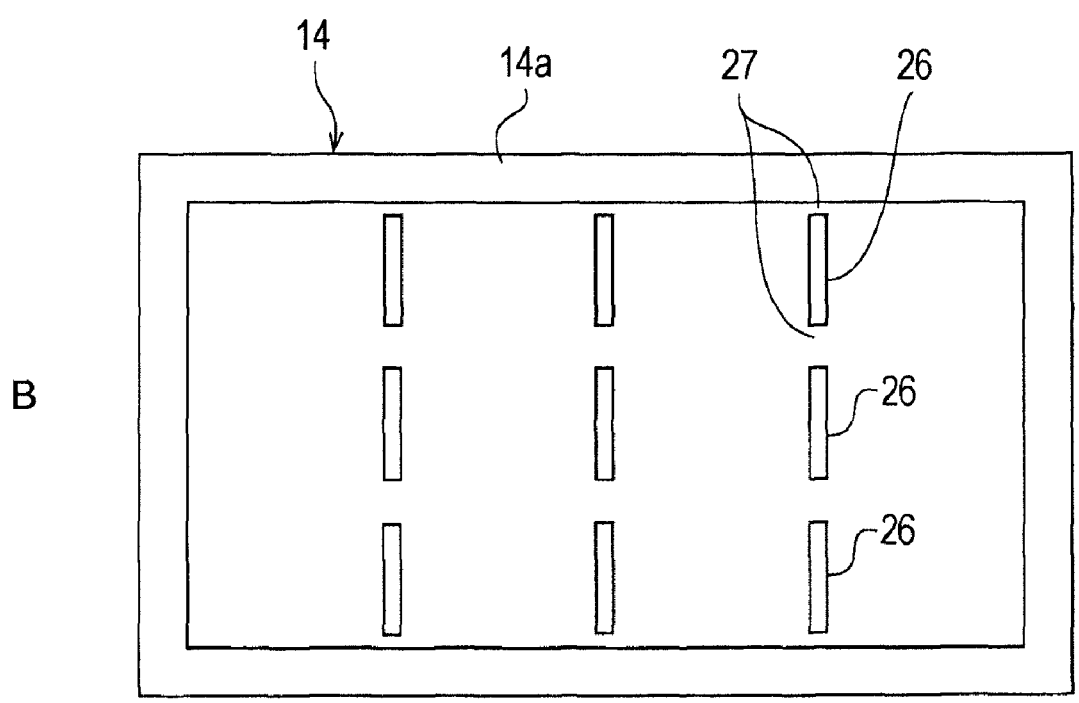

Part A of FIG. 5 and part B of FIG. 5 show a second embodiment of the present invention. The present embodiment differs from the above-described first embodiment in that the projections which section the areas in which individual lens elements are formed has a linear shape. Here, in the figure, components corresponding to those in the above-described first embodiment are denoted by the same reference numerals, and detailed explanations thereof are omitted.

Part A of FIG. 5 is a plan view of a common substrate 14 which forms a lens array, and shows an example in which linear projections 26 are arranged in a two-dimensional grid pattern so that twelve rectangular lens-element forming areas in total are sectioned along three rows and four columns between the projections 26 adjacent to each other. Passages 27 for allowing liquid communication between the adjacent lens elements are formed in the projections 26. Although the passages 27 are formed between the projections 26 that are arranged linearly, they may also be formed by cutting portions of the projections 26.

Part B of FIG. 5 is a plan view of a common substrate 14 which forms a lens array. Linear projections 26 are arranged in a one-dimensional grid pattern so that four areas in total for forming cylindrical lenses (or lenticular lenses) are sectioned along a single row and four columns between the projections 26 adjacent to each other. Also in this example, passages 27 for allowing liquid communication between the adjacent lens elements are formed.

Also in these examples, similar to the above-described embodiment, the effective lens area can be increased and the transmittance can be improved. In addition, differences in the amounts of liquid between the elements can be reduced and the lens characteristics can be made uniform.

Third Embodiment

Figure 6:
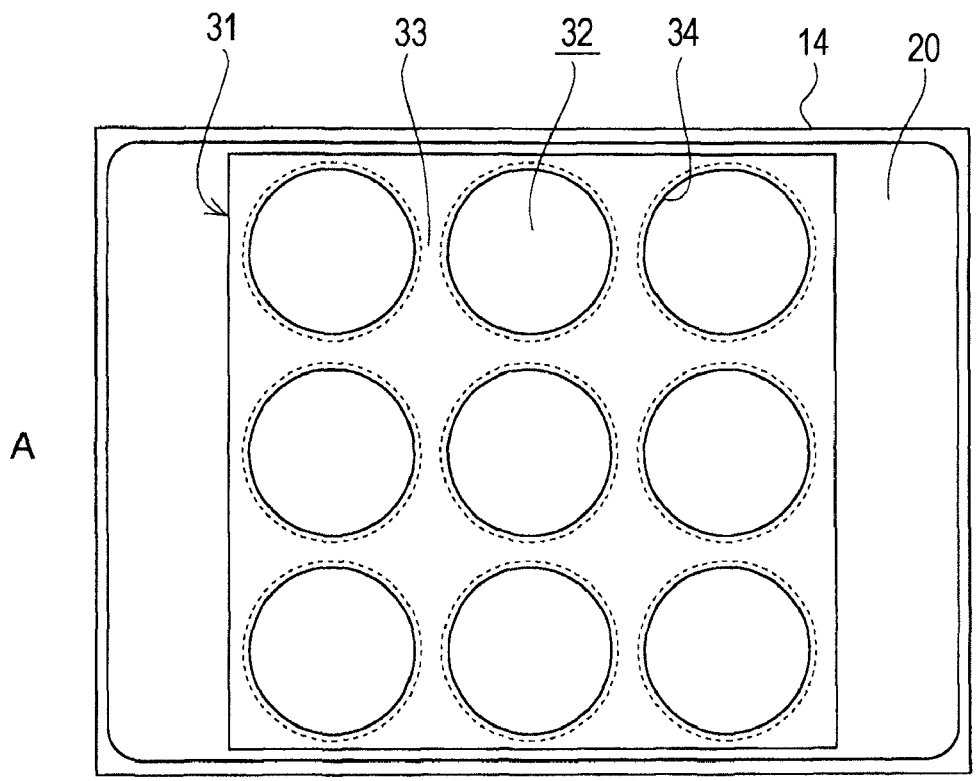
FIG. 6 is a diagram showing the schematic structure of a lens array according to a third embodiment of the present invention, wherein part A is a plan view showing the inner structure of the lens array and part B is a sectional view of the main part of the lens array.
Figure 6:
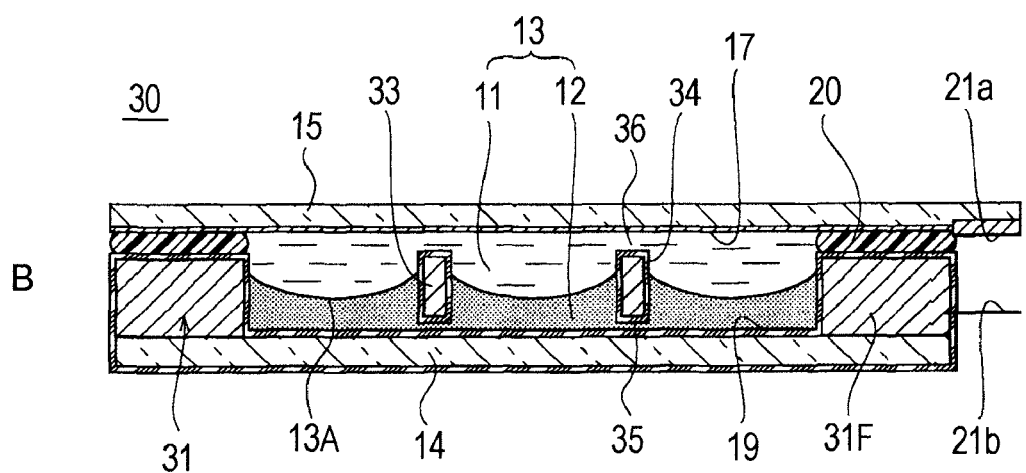

Part A of FIG. 6 and part B of FIG. 6 show the schematic structure of a lens array 30 according to a third embodiment of the present invention. Part A of FIG. 6 is a plan view showing the inner structure of the lens array 30, and part B of FIG. 6 is a sectional view of the main part of the lens array 30. Here, in the figure, components corresponding to those in the above-described first embodiment are denoted by the same reference numerals, and detailed explanations thereof are omitted.

Similar to the above-described first embodiment, a plurality of lens elements 13 including first liquid 11 and second liquid 12 are two-dimensionally arranged in a liquid chamber that is formed between a common substrate 14 and a lid body 15. Here, in the present embodiment, the common substrate 14 is formed of a transparent plate member having a flat front surface and a flat back surface, similar to the lid body 15.

In the present embodiment, a perforated plate 31 is disposed between the common substrate 14 and the lid body 15, and the individual lens elements 13 are placed in a plurality of circular openings 32 formed in a surface of the perforated plate 31. The individual lens elements 13 are sectioned by an opening-free portion 33 of the perforated plate 31. Passages 35 for allowing liquid communication between the adjacent openings 32 are formed between the perforated plate 31 and the common substrate 14. Passages 36 for allowing liquid communication between the adjacent openings 32 are formed between the perforated plate 31 and the lid body 15. The passages 35 at one side is formed by forming a recess in a surface of the perforated plate 31 that faces the common substrate 14. The passages 36 at the other side are formed by the thickness at which the sealing member 20 is formed in the process of forming the liquid chamber.

The perforated plate 31 has a frame portion 31F at the periphery thereof. The bottom surface of the frame portion 31F is bonded to the common substrate 14, and the top surface of the frame portion 31F is tightly fixed to the lid body 15 with the sealing member 20 interposed therebetween. Although the perforated plate 31 is formed of a semiconductor material, such as a silicon substrate, in the present embodiment, it may also be formed of other materials, such as a metal plate and an insulative substrate made of glass, ceramic, resin, or the like. In the case where an insulative resin is used, an electrode film made of a conductive material is formed. The perforated plate 31 is connected to an external voltage source (not shown) through a terminal portion 21b. The front and back surfaces of the perforated plate 31 and peripheral surfaces of the openings 32 are covered by an insulting film 34, so that the first liquid 11, which is conductive, is electrically insulated from the perforated plate 31.

The material of the insulting film 34 is not particularly limited as long as the material has water repellency, transparency, and a predetermined withstand voltage and the film thickness and the film quality thereof are uniform. The operating voltage of the lens elements 13 varies in accordance with the film thickness and dielectric constant of the insulting film 34. The operating voltage decreases as the film thickness of the insulting film 34 decreases and the dielectric constant thereof increases. The insulting film 34 may be formed either before the process of bonding the perforated plate 31 and the common substrate 14 together, or after the bonding process.

Various kinds of bonding methods can be used to bond the perforated plate 31 and the common substrate 14 together depending on the materials and the like of the perforated plate 31 and the common substrate 14. For example, in the case where the perforated plate 31 is formed of a silicon substrate and the common substrate 14 is formed of a glass material as described above, the perforated plate 31 and the common substrate 14 can be bonded together by an anode coupling method. Alternatively, in the case where the perforated plate 31 and the common substrate 14 are both formed of synthetic resin, a diffusion bonding method, an ultrasonic bonding method, or the like can be used. In addition, a bonding method using an adhesive can also be used irrespective of the combination of materials of the perforated plate 31 and the common substrate 14.

Similar to the first embodiment, the lens array 30 according to the present embodiment which is structured as described above includes a plurality of lens elements 13 in which the first liquid 11 is disposed at the lid-body-15 side and the second liquid 12 is disposed at the common-substrate-14 side. The positions at which the individual lens elements 13 are arranged are determined by the positions at which the openings 32 are formed in the perforated plate 31. In the example shown in part A of FIG. 6, nine circular lens elements 13 in total are arranged along a plane in an array pattern of three rows and three columns. Here, the number of lens elements 13 which are arranged is not limited to the above-described example, and the number of lens elements 13 which are arranged can be arbitrarily adjusted in accordance with the number of openings 32 which are formed.

In the state shown in part B of FIG. 6, the first liquid 11 is in contact with the peripheral surfaces of the openings 32 in the perforated plate 31 at a predetermined contact angle, so that lens surfaces 13A of the respective lens elements 13 have a predetermined curved surface shape. The lens surfaces 13A have a curved surface shape and are concavely curved at central areas of the elements.

When a voltage is applied between the terminal portions 21a and 21b in this state, the first liquid 11 spreads over the peripheral portions of the openings 32 due to the electrowetting effect (electrocapillarity). Accordingly, the contact angle at which the first liquid 11 is in contact with the peripheral portions of the openings 32 changes, which causes a change in the shape of the lens surfaces 13A. The shape of the lens surfaces 13A changes reversibly. Therefore, the lens surfaces 13A of the respective lens elements 13 arbitrarily change in accordance with the magnitude of the voltage applied to the terminal portions 21a and 21b. More specifically, when the applied voltage is increased, the lens array 30 can be causes to function as a varifocal lens for light that passes through the lens array 30.

According to the present embodiment, the perforated plate 31 is disposed between the common substrate 14 and the lid body 15, and the lens elements 13 are sectioned by the opening-free portion 33 of the perforated plate 31. In addition, communication of droplets between the adjacent lens elements 13 is provided through the passages 35 and 36. Accordingly, differences in the amounts of the first liquid 11 and the second liquid 12 between the individual lens elements 13 can be reduced. In addition, it becomes unnecessary to adjust the amount of liquid for each element at high accuracy. Due to the above-described structure, the lens characteristics of the individual lens elements 13 included in lens array 30 can be easily and uniformly performed and the lens array 30 can be easily assembled.

In the present embodiment, the thickness of the perforated plate 31 in which the openings 32 are formed is set such that the change in the shape of the lens surfaces 13A is not suppressed when the applied voltage is in a set range. In addition, the shape of the openings 32 is not limited to circular, and may also be a polygonal shape, such as rectangular, or another geometric shape, such as oval. Here, if the openings 32 are circular, the effective area of the lens elements 13 as a lens can be increased. Therefore, the lens elements 13 having excellent optical characteristics can be obtained. Alternatively, if the openings 32 are polygonal, the open area of the openings 32 can be increased. As described in the first embodiment, the dimension of the openings 32 is preferably set equal to or less or less than the capillary length.

In addition, the positions at which the openings 32 are formed are not limited to those in the case shown in part A of FIG. 6 in which the openings 32 are aligned in the vertical direction and the horizontal direction. For example, as shown in part A of FIG. 7, the structure in which the openings 32 are densely arranged such that the openings 32 are arranged in a row direction and each opening 32 is positioned between the openings 32 in the previous row can also be adopted.

Figure 7:
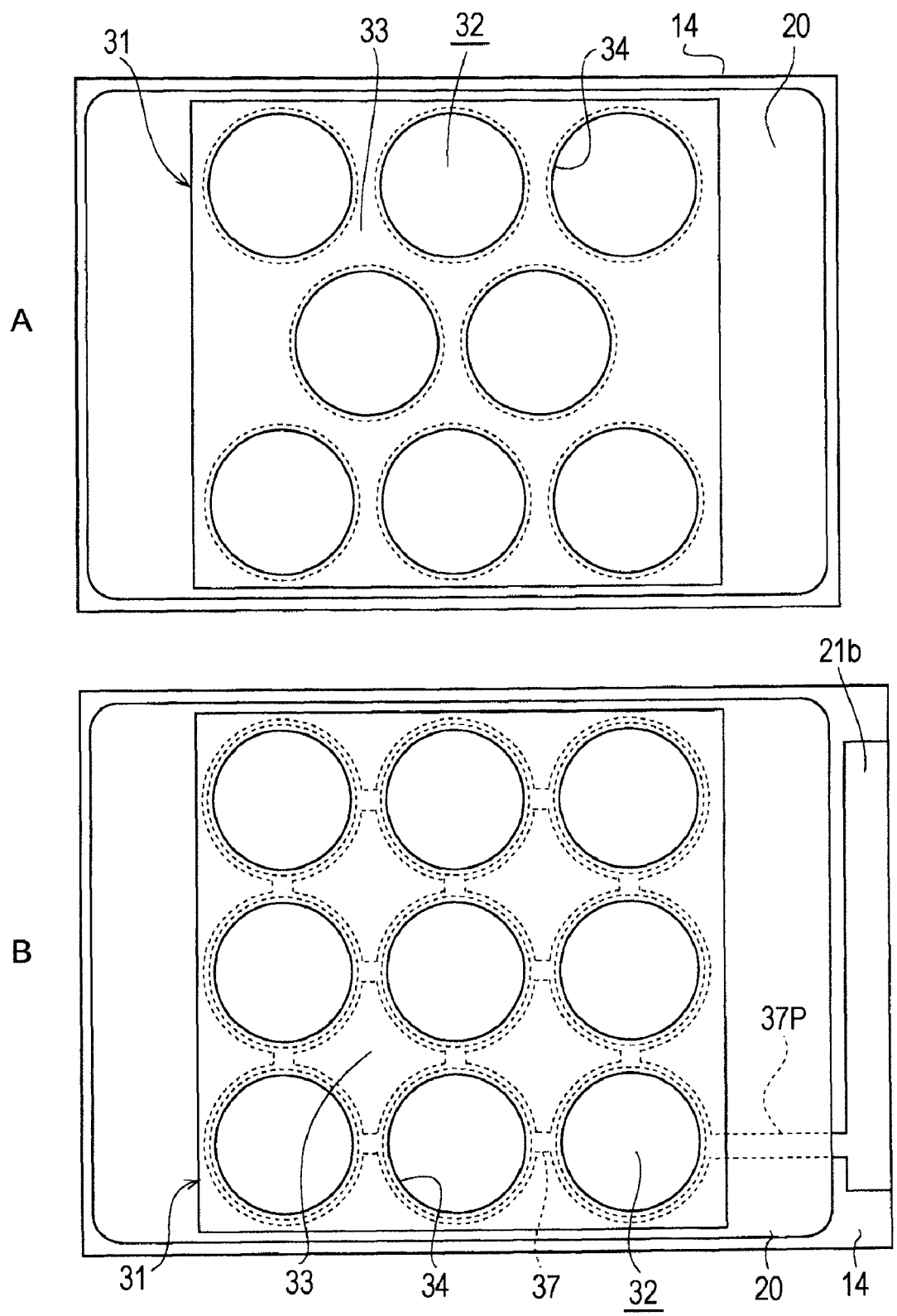
FIG. 7 shows plan views of perforated plates to illustrate the structures of lens arrays according to modifications of the third embodiment of the present invention.
Figure 8:
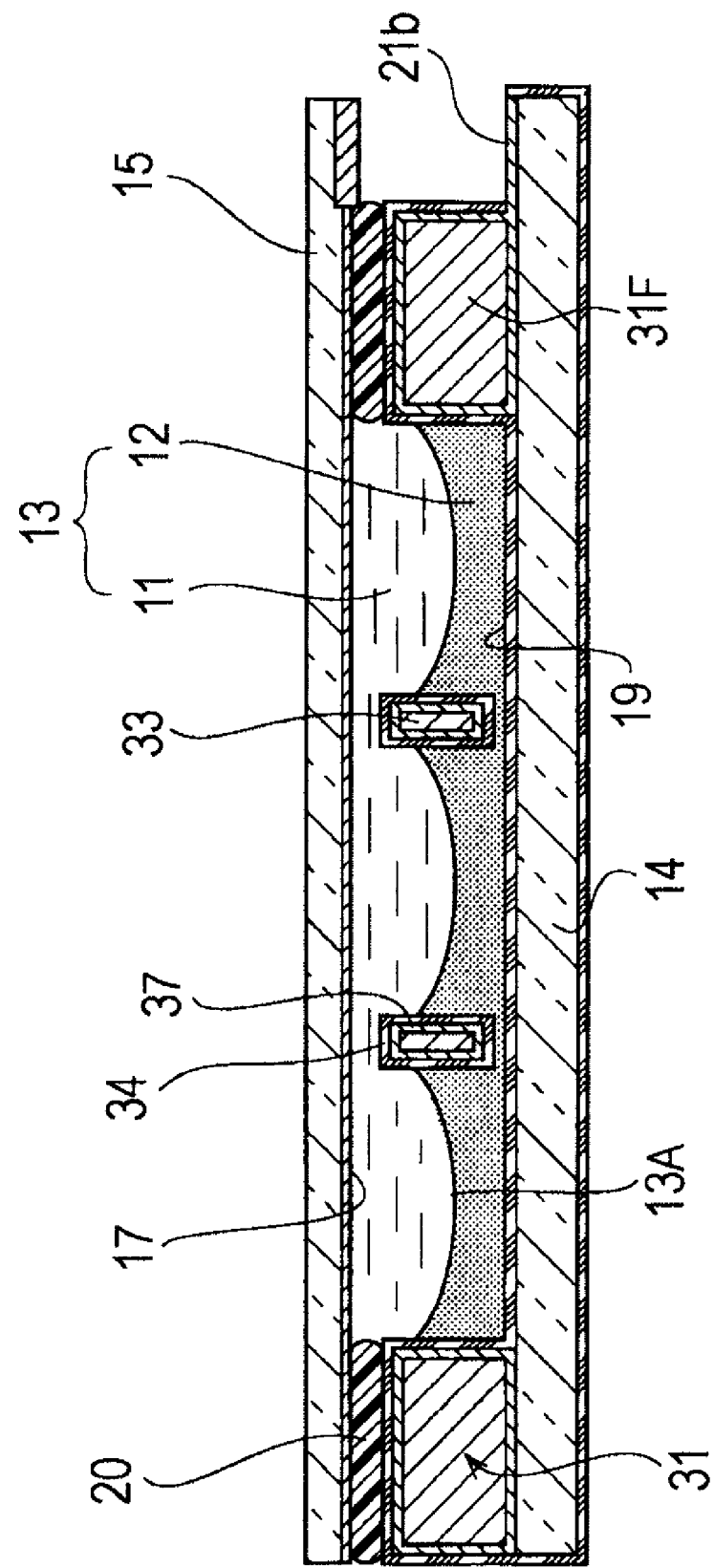
FIG. 8 is a sectional view of the main part of a lens array having the perforated plate structures as shown in part B of FIG. 7.

On the other hand, in the case where the perforated plate 31 is made of an insulative material, such as glass, plastic, and ceramic, as shown in part B of FIG. 7, a pattern of transparent conductive film made of ITO or the like can be formed on the peripheral portion of each opening 32 as electrodes 37. As shown in FIG. 8, the electrodes 37 are covered with the insulting film 34 having water repellency. The electrodes 37 extend between the individual openings 32 on a mesh, and are connected in common to the terminal portion 21b, which is formed on a surface of the common substrate 14 at one end thereof, through a communicating portion 37P formed on the outer surface of the frame portion 31F of the perforated plate 31. Here, if the electrodes 37 are independently formed for the respective openings 32 and are individually connected to terminal portions 21b that are provided for the respective openings, each of the lens elements 13 can be independently driven.

In addition, instead of the structure in which the perforated plate 31 faces the common substrate 14 and the lid body 15 with the liquid communication passages 35 and the liquid communication passages 36 provided therebetween, the following structure may also be adopted. That is, for example, the perforated plate 31 and the lid body 15 may be in tight contact with each other and liquid communication may be provided only by the passages 35 between the perforated plate 31 and the common substrate 14.

Figure 9:
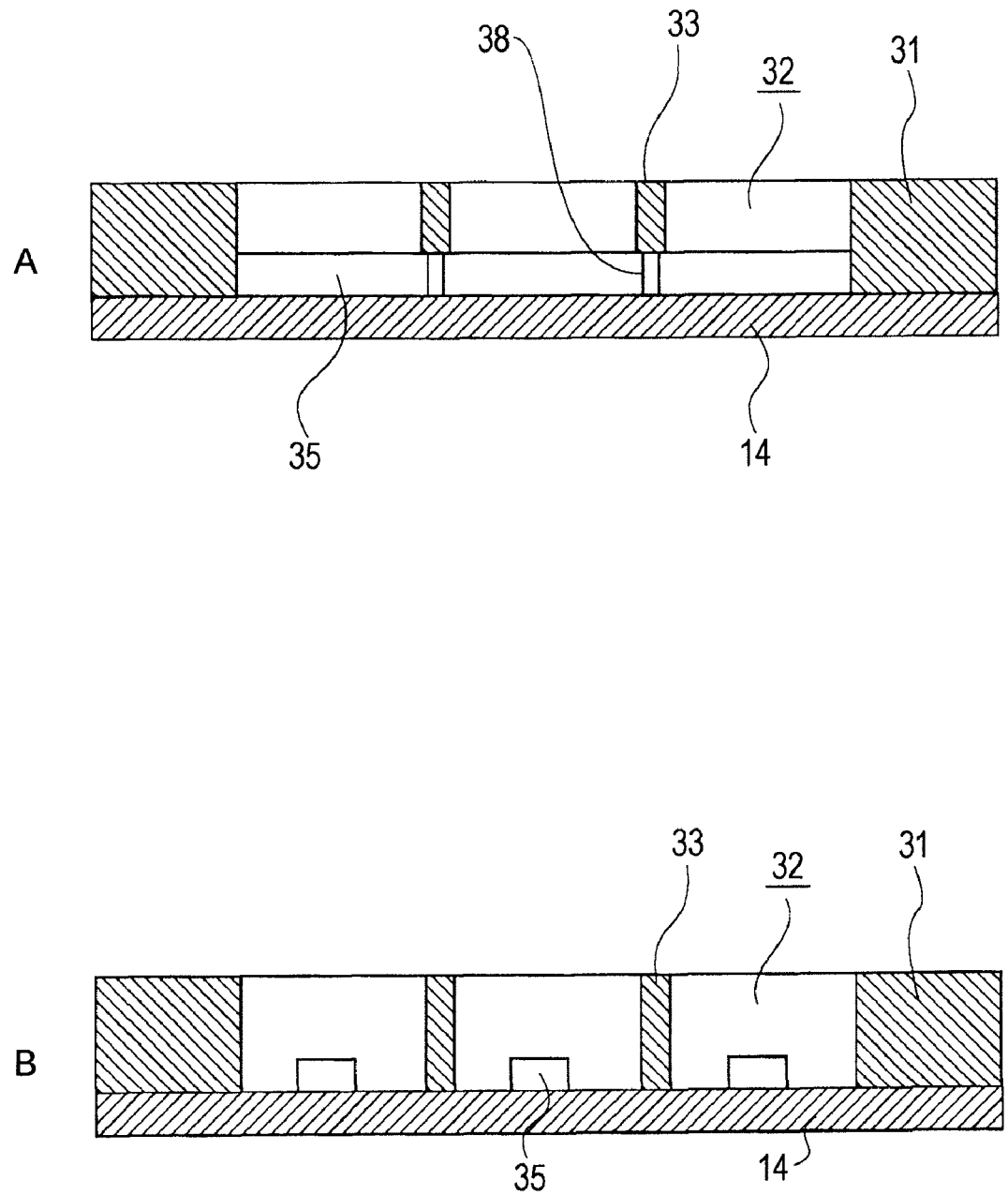
FIG. 9 shows sectional views of perforated plates to illustrate the structures of lens arrays according to other modifications of the third embodiment of the present invention.

In addition, as shown in part A of FIG. 9, supporting rods 38 may be disposed between the perforated plate 31 and the common substrate 14, so that the clearance between the perforated plate 31 and the common substrate 14 may be maintained constant and differences in the amounts of liquid between the lens elements 13 can be reduced. In addition, it becomes possible to increase the resistance to external stress. Here, the supporting rods 38 are formed between the opening-free portion 33 of the perforated plate 31 and the common substrate 14. The size, shape, and the number of supporting rods 38 are not particularly limited. The supporting rods 38 may be formed either on the common substrate 14 or on the perforated plate 31. The supporting rods 38 are not limited to those which are formed integrally with the common substrate 14 or the perforated plate 31, and may also be formed as separate components.

On the other hand, part B of FIG. 9 is a sectional view of the main part of an example of the structure in which the passages 35 are formed in the bottom surface of the perforated plate 31 so as to allow the communication of droplets between the adjacent openings 32. The shape, size, and the number of passages 35 and the positions at which the passages 35 are formed are not particularly limited. However, they are preferably designed such that the first liquid 11 and the second liquid 12 can be easily introduced into the openings 32.

Next, a method for manufacturing the lens array 30 according to the present embodiment will be described.

Figure 10:
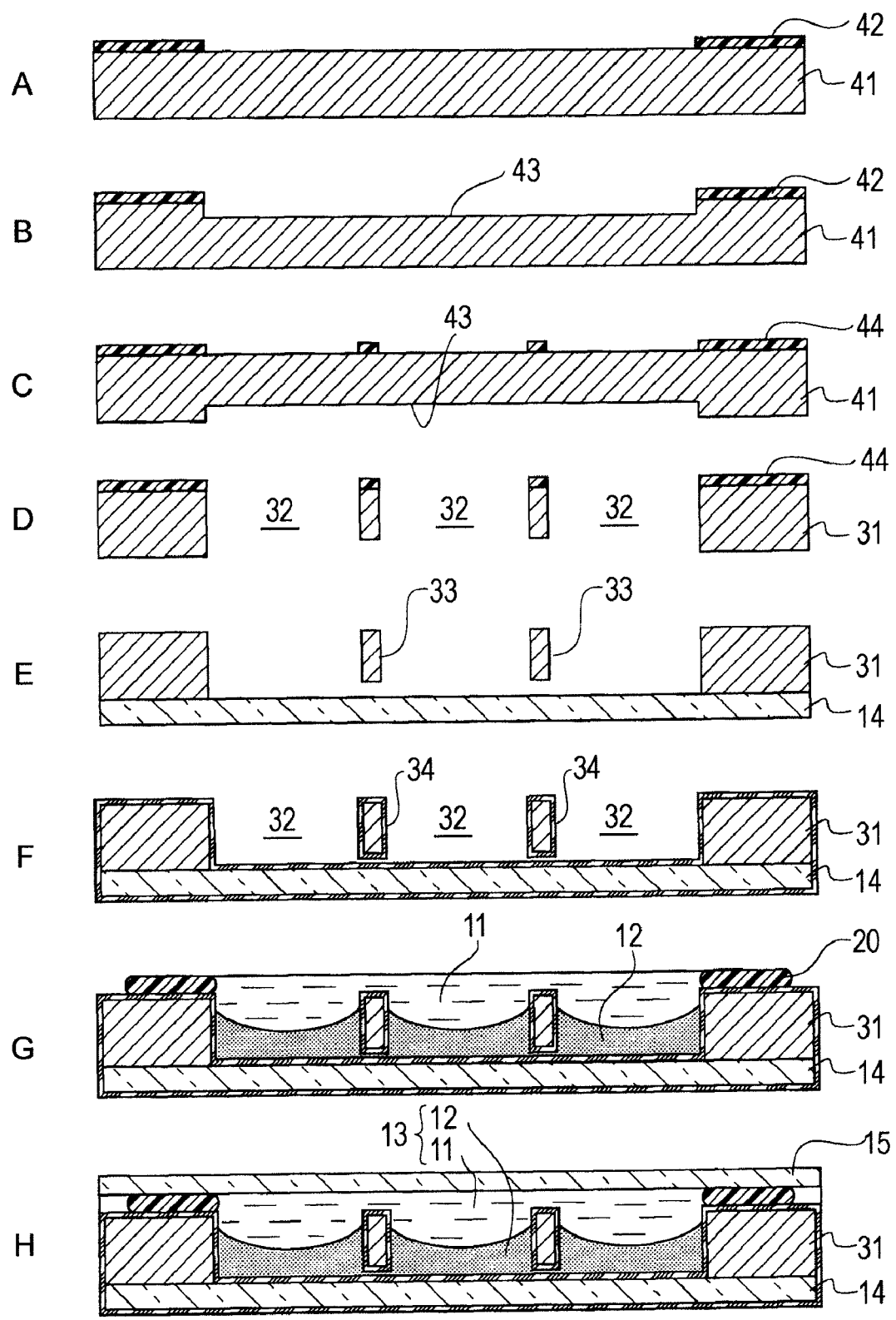
FIG. 10 shows sectional views of the main part illustrating the steps of a method for manufacturing the lens array according to the third embodiment of the present invention.

FIG. 10 shows sectional views of the main part illustrating the steps of a method for manufacturing the lens array 30. In the example shown in the figure, a silicon substrate is used as the perforated plate 31 and a glass substrate made of Pyrex glass (trade name) or the like is used as the common substrate 14.

First, as shown in part A of FIG. 10, a resist layer 42 is formed on one surface of a silicon substrate 41, which forms the perforated plate 31, in a pattern having a predetermined shape using photolithography techniques. Then, as shown in part B of FIG. 10, the one surface of the silicon substrate 41 is etched by a predetermined amount using the resist layer 42 as a mask. Thus, a recess 43 having a predetermined depth is formed in the one surface of the silicon substrate 41. The recess 43 forms the liquid communication passages 35 (part B in FIG. 6) between the perforated plate 31 and the common substrate 14 in the lens array 30.

Next, the resist layer 42 is removed. Then, as shown in part C of FIG. 10, a resist layer 44 is formed on the other surface of the silicon substrate 41 in a pattern having a predetermined shape using photolithography techniques. Then, as shown in part D of FIG. 10, the other surface of the silicon substrate 41 is etched using the resist layer 44 as a mask so that a plurality of openings 32 are formed in the silicon substrate 41 so as to extend therethrough. Thus, the perforated plate 31 to be disposed between the common substrate 14 and the lid body 15 is manufactured.

Next, the resist layer 44 is removed. Then, as shown in part E of FIG. 10, one surface of the perforated plate 31 and the top surface of the common substrate 14 are integrated with each other by anode coupling. Then, as shown in part F of FIG. 10, the insulting film 34 is formed on the surfaces of each of the perforated plate 31 and the common substrate 14. As a result, the opening-free portion 33 of the perforated plate 31 is covered with the insulting film 34.

Next, as shown in part G of FIG. 10, the sealing member 20 is disposed on the top surface of the frame portion of the perforated plate 31 to form the liquid chamber. In addition, the first liquid 11 that is conductive and the second liquid 12 that is insulative are introduced into the openings 32 in the perforated plate 31. Examples of methods for introducing the first liquid 11 and the second liquid 12 include a method in which a predetermined amount of second liquid 12 is injected into each opening 32 using liquid dropping means, such as a syringe or a dispenser nozzle, and then the liquid chamber is filled with the first liquid 11, and a method in which the liquid chamber is filled with the first liquid 11 first, and then a predetermined amount of second liquid 12 is individually injected into each of the openings 32.

Lastly, as shown in part H of FIG. 10, the lid body 15 is placed on the sealing member 20 and the first liquid 11 and the second liquid 12 are sealed in the liquid chamber. Thus, the lens array 30 in which the lens elements 13 including the first liquid 11 and the second liquid 12 are two-dimensionally arranged is manufactured.

According to the structure of the present embodiment, since the adjacent lens elements 13 liquidly communicate with each other, differences in the amounts of liquid between the lens elements 13 can be reduced. In addition, it becomes unnecessary to adjust the amount of liquid for each element at high accuracy. Due to the above-described structure, the lens characteristics of the individual lens elements 13 included in lens array 30 can be easily and uniformly performed and the lens array 30 can be easily assembled.

Figure 11:
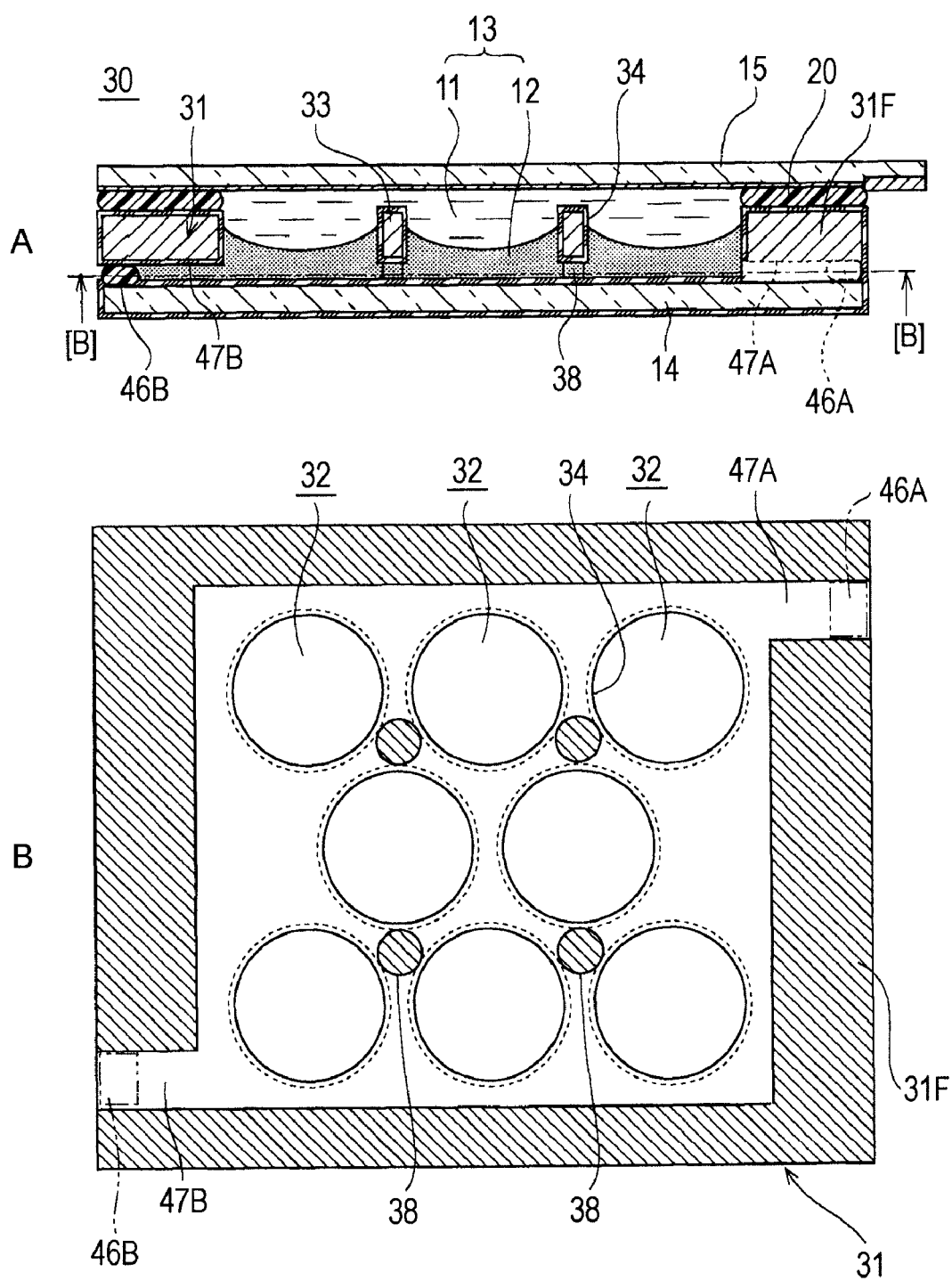
FIG. 11 is a diagram showing the structure of a lens array according to a modification of the third embodiment of the present invention, wherein part A of FIG. 11 is a sectional view of the main part of the lens array and part B of FIG. 11 is a sectional view of part A of FIG. 11 taken along line [B]-[B].

Next, another method for manufacturing the lens array 30 will be described with reference to FIGS. 11 to 13. Here, part A of FIG. 11 is a sectional view of the main part illustrating the structure of the lens array 30. Part B of FIG. 11 is a sectional view of part A of FIG. 11 taken along line [B]-[B].

Figure 12:
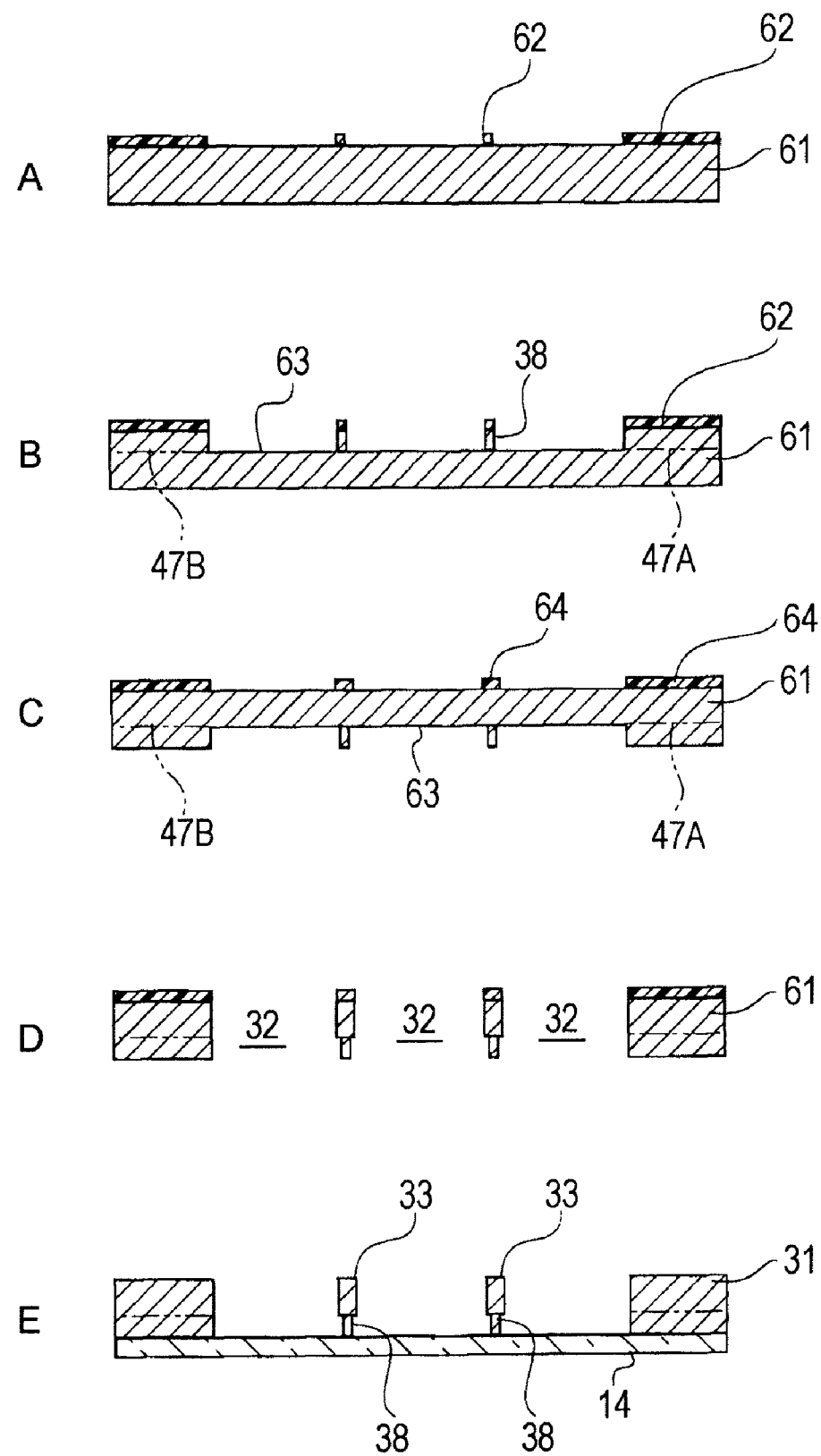
FIG. 12 shows sectional views of the main part illustrating the steps of a method for manufacturing the lens array shown in FIG. 11.
Figure 13:
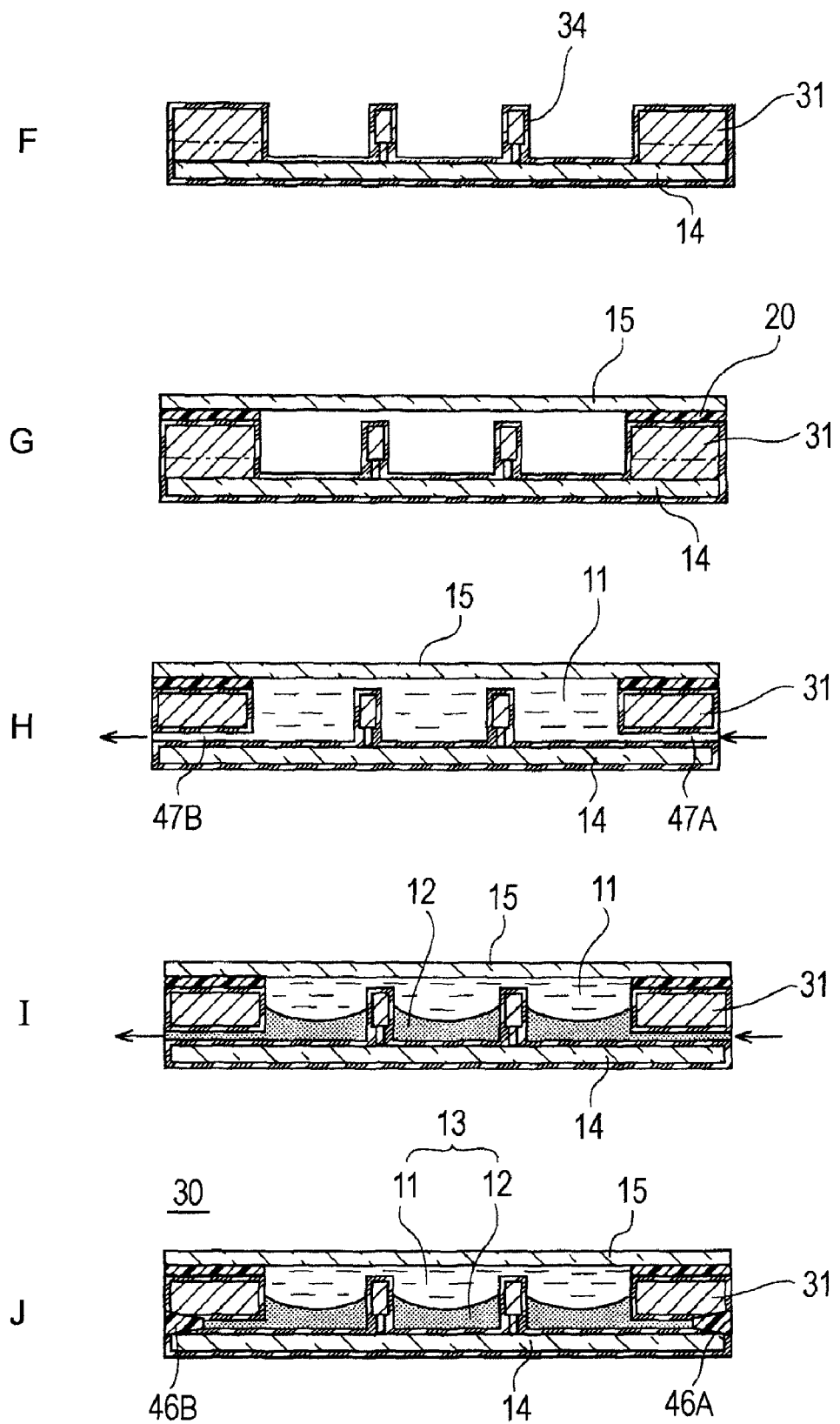
FIG. 13 shows sectional views of the main part illustrating the steps of the method for manufacturing the lens array shown in FIG. 11.
Figure 14:
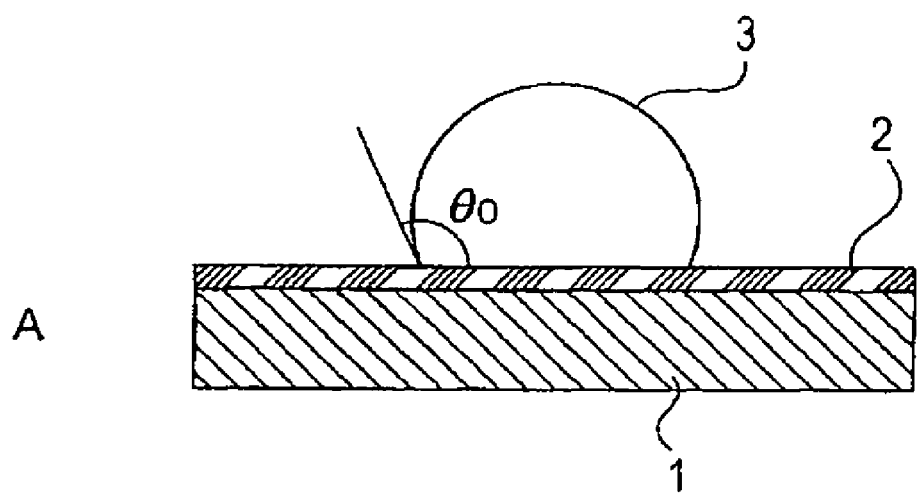
FIG. 14 shows principle diagrams illustrating electrocapillarity.
Figure 14:
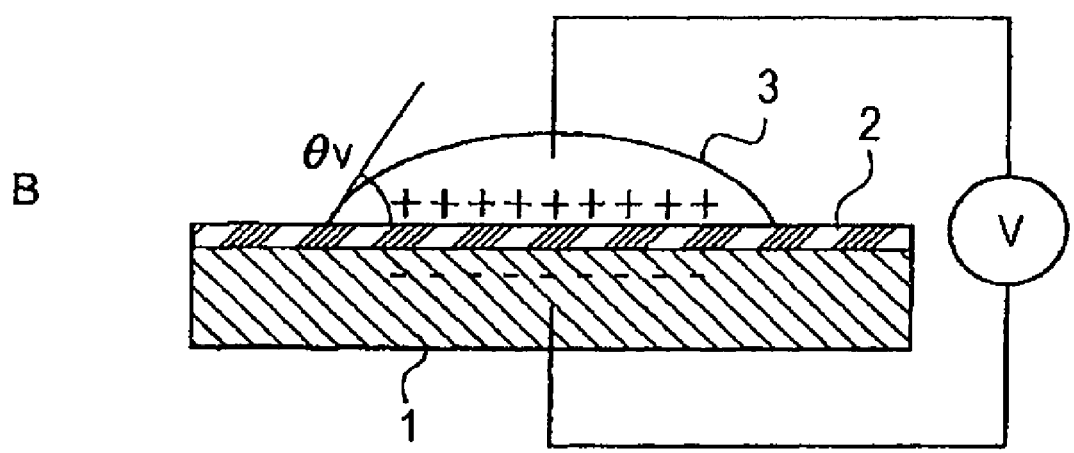
Figure 15:
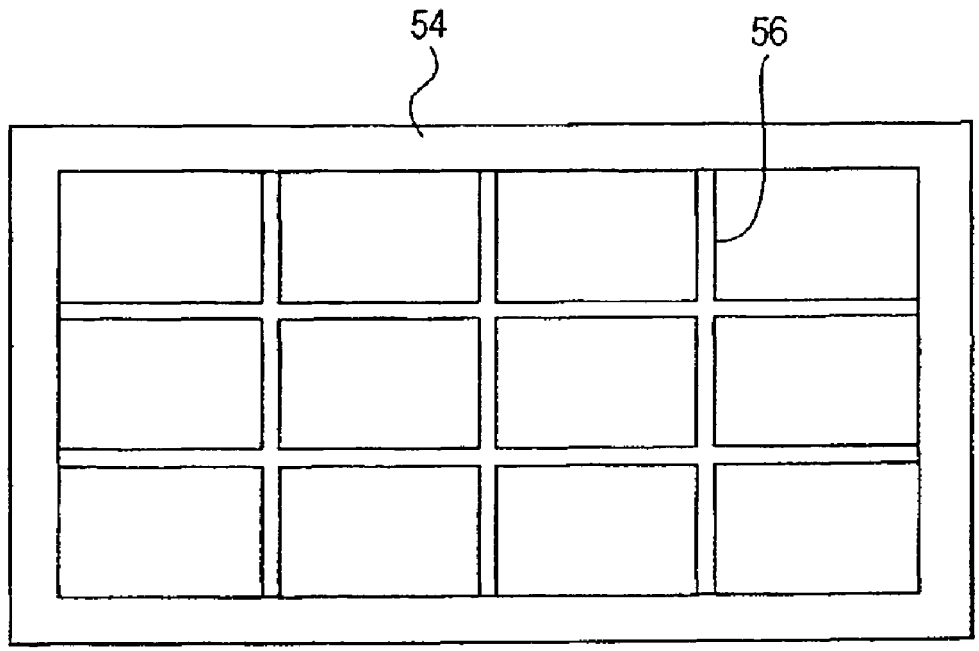
FIG. 15 is a diagram showing the schematic structure of a lens array according to a related art, wherein part A of FIG. 15 is a plan view of a common substrate and part B of FIG. 15 is a sectional view of the main part of the lens array.
Figure 15:
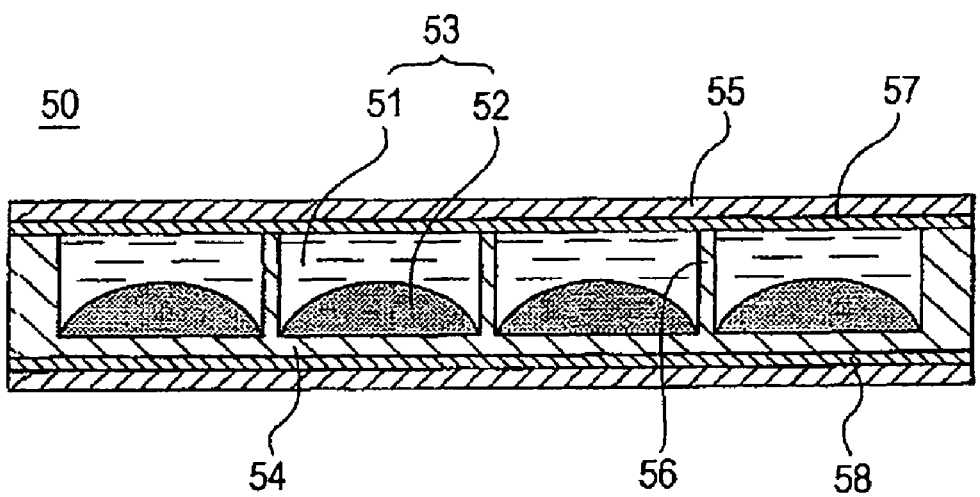

FIG. 12 and FIG. 13 show sectional views illustrating the steps of a method for manufacturing the lens array 30.

The lens array 30 shown in FIG. 11 is structured such that a liquid inlet 47A for introducing the first liquid 11 and the second liquid 12 into the liquid chamber and a liquid outlet 47B for discharging the first liquid 11 and the second liquid 12 from the liquid chamber are formed in the frame portion 31F of the perforated plate 31 at predetermined positions thereof. In addition, the liquid inlet 47A and the liquid outlet 47B are sealed with sealing members 46A and 46B, respectively. The positions at which the liquid inlet 47A and the liquid outlet 47B are formed are not particularly limited. However, in this example, they are formed at positions symmetric to each other about the center of the perforated plate 31.

In addition, in the lens array 30 shown in FIG. 11, supporting rods 38 are provided between the opening-free portion 33 of the perforated plate 31 and the common substrate 14. The supporting rods 38 are structured as shown in part A of FIG. 9, and detailed explanations thereof are omitted here. Here, in this example, the supporting rods 38 are formed integrally with the perforated plate 31.

A method for manufacturing the lens array 30 having the above-described structure will be described with reference to FIGS. 12 and 13. First, as shown in part A of FIG. 12, a resist layer 62 is formed on one surface of a silicon substrate 61, which forms the perforated plate 31, in a pattern having a predetermined shape using photolithography techniques. Then, as shown in part B of FIG. 12, the one surface of the silicon substrate 61 is etched by a predetermined amount using the resist layer 62 as a mask. Thus, a recess 63 having a predetermined depth is formed in the one surface of the silicon substrate 61. In addition, the supporting rods 38, the liquid inlet 47A, and the liquid outlet 47B are formed. Here, the recess 63 forms the liquid communication passages between the perforated plate 31 and the common substrate 14.

Next, the resist layer 62 is removed. Then, as shown in part C of FIG. 12, a resist layer 64 is formed on the other surface of the silicon substrate 61 in a pattern having a predetermined shape using photolithography techniques. Then, as shown in part D of FIG. 12, the other surface of the silicon substrate 61 is etched using the resist layer 64 as a mask so that a plurality of openings 32 are formed in the silicon substrate 61 so as to extend therethrough. Thus, the perforated plate 31 to be disposed between the common substrate 14 and the lid body 15 is manufactured.

Next, the resist layer 64 is removed. Then, as shown in part E of FIG. 12, the one surface of the frame portion of the perforated plate 31 and the ends of the supporting rods 38 are integrated with the top surface of the common substrate 14 by anode coupling. Then, as shown in part F of FIG. 13, the insulting film 34 is formed on the surfaces of each of the perforated plate 31 and the common substrate 14. As a result, the opening-free portion 33 of the perforated plate 31 including the supporting rods 38 is covered with the insulting film 34.

Next, as shown in part G of FIG. 13, the liquid chamber is formed by placing the lid body 15 on the top surface of the frame portion of the perforated plate 31 with the sealing member 20 interposed therebetween. Next, as shown in part H of FIG. 13, the first liquid 11 is introduced through the liquid inlet 47A, so that the first liquid 11 fills the liquid chamber through the liquid communication passages formed between the perforated plate 31 and the common substrate 14 and between the perforated plate 31 and the lid body 15. At this time, the liquid outlet 47B is opened so that residual air in the liquid chamber and excess first liquid 11 can be discharged from the liquid outlet 47B. It is to be noted that, in part H and the following parts of FIG. 13, the liquid inlet 47A and the liquid outlet 47B are shown in the sectional views.

Next, as shown in part I of FIG. 13, the second liquid 12 is introduced through the liquid inlet 47A while the liquid outlet 47B is maintained in the open state. The second liquid 12 flows through the liquid communication passages between the perforated plate 31 and the common substrate 14 over the entire area of the liquid chamber, and spreads over the peripheral surfaces of the openings 32 in the perforated plate 31 due to the insulting film 34 having water repellency. In an early stage of introduction of the second liquid 12, the first liquid 11 is discharged from the liquid outlet 47B. However, when the second liquid 12 reaches the liquid outlet 47B, the discharge of the first liquid 11 stops. Lastly, as shown in part J of FIG. 13, the liquid inlet 47A and the liquid outlet 47B are sealed with the sealing members 46A and 46B, respectively.

Here, in the case where the speed at which the second liquid 12 spreads is low, the process of introducing the second liquid 12 is continued after the second liquid 12 reaches the liquid outlet 47B so as to increase the amount of second liquid 12 in the liquid chamber and raise the interface between the first liquid 11 and the second liquid 12.

Thus, the lens array 30 in which the lens elements 13 including the first liquid 11 and the second liquid 12 are two-dimensionally arranged in the liquid chamber can be manufactured. According to the present embodiment, since the adjacent lens elements 13 liquidly communicate with each other, differences in the amounts of liquid between the lens elements 13 can be reduced. In addition, it becomes unnecessary to adjust the amount of liquid for each element at high accuracy. Due to the above-described structure, the lens characteristics of the individual lens elements 13 included in lens array 30 can be made uniform and the lens array 30 can be easily assembled.

According to the present embodiment, the lens array 30 is manufactured by successively introducing the first liquid 11 and the second liquid 12 from the side of the liquid chamber. Therefore, it is not necessary to perform the process of individually dropping the droplets of second liquid 12 while adjusting the amount thereof, and the assembly process of the lens array 30 can be easily performed. In addition, a structure having a very small lens diameter (for example, several micrometers to several tens of micrometers), which cannot be obtained by a liquid introducing method using a syringe, a dispenser nozzle, or the like, can be easily obtained.

Also, according to the present embodiment, introduction pressures of the first liquid 11 and the second liquid 12 can be adequately adjusted. For example, when the pressure in the liquid chamber is maintained at a pressure higher than the atmospheric pressure, a device that is not easily influenced by the external environment (for example, a reduction in pressure in high mountains or an increase in pressure under water) can be obtained.

In addition, the sealing members 46A and 46B can be obtained by attaching elastic bodies, such as rubber stoppers, to the liquid inlet 47A and the liquid outlet 47B and then curing the outer sides thereof with an adhesive, or by directly injecting an adhesive into the liquid inlet 47A and the liquid outlet 47B and curing the adhesive. Alternatively, the sealing members 46A and 46B may also be formed of check valves (non-return valves) which regulate the direction in which liquid flows.

The invention claimed is:

1. A lens array comprising:
a first liquid that is conductive;
a second liquid that is insulative and that has a refractive index different from that of the first liquid; and
a plurality of lens elements having lens surfaces at an interface between the first liquid and the second liquid,
wherein the lens surfaces of the lens elements reversibly vary in accordance with output control of an applied voltage, and
wherein the lens array is characterized in that horizontally adjacent lens elements are separated by a barrier and fluid channels are provided between the adjacent lens elements respectively providing transfer of the first liquid and the second liquid between the adjacent lens elements.

2. The lens array according to claim 1, characterized in that the lens elements are two-dimensionally arranged in a liquid chamber formed between a common substrate and a lid body that faces the common substrate, and
at least one of the first liquid and the second liquid communicates between the adjacent lens elements with respect to each other.

3. The lens array according to claim 2, characterized in that a perforated plate is disposed in the liquid chamber, the perforated plate forming passages that allow liquid communication at least between the perforated plate and the common substrate, and
the lens elements are sectioned by an opening-free portion of the perforated plate.

4. The lens array according to claim 3, characterized in that openings in the perforated plate have a circular shape.

5. The lens array according to claim 3, characterized in that at least peripheral portions of the openings in the perforated plate are formed of a conductive body, and the peripheral portions of the openings are covered with a water repellent film.

6. The lens array according to claim 2, characterized in that a liquid inlet that guides the first liquid and the second liquid to the inside of the liquid chamber from the outside and a liquid outlet that discharges the first liquid and the second liquid to the outside of the liquid chamber from the inside are provided between the common substrate and the lid body.

7. The lens array according to claim 1, characterized in that the lens elements are sectioned by a plurality of projections provided so as to stand upright on the common substrate.

8. The lens array according to claim 7, characterized in that the projections are rod-shaped projections disposed at four corners of each of the lens elements.

9. The lens array according to claim 7, characterized in that the projections are linear projections which are disposed between the adjacent lens elements and in which passages for allowing liquid communication between the adjacent lens elements are formed.

10. The lens array according to claim 7, characterized in that
a distance between the adjacent projections is set equal to or less or less than a capillary length.

11. The lens array according to claim 7, characterized in that
surfaces of the projections are covered with a transparent electrode film, and a surface of the transparent electrode film is covered with a water repellent film.

* * * * *